(12) United States Patent
Dejesus (10) Patent No.: US 10,557,602 B1
(45) Date of Patent: Feb. 11, 2020

(54) ILLUMINATED STROLLER ASSEMBLY (71) Applicant: Hidalberto Dejesus, Monroe, NY (US)

(72) Inventor: Hidalberto Dejesus, Monroe, NY (US)

( * ) Notice: Subject to any disclaimer, the term of this patent is extended or adjusted under 35 U.S.C. 154(b) by 0 days.

(21) Appl. No.: 16/387,597

(22) Filed: Apr. 18, 2019

(51) Int. Cl.
*B62B 3/02* (2006.01)
*F21S 9/02* (2006.01)
*B62B 7/08* (2006.01)
*B62B 9/00* (2006.01)
*B62B 9/26* (2006.01)
*B62B 9/14* (2006.01)
*F21Y 115/10* (2016.01)
*B62B 7/00* (2006.01)

(52) U.S. Cl.
CPC .................. *F21S 9/02* (2013.01); *B62B 7/08* (2013.01); *B62B 9/005* (2013.01); *B62B 9/14* (2013.01); *B62B 9/26* (2013.01); *B62B 7/004* (2013.01); *F21Y 2115/10* (2016.08)

(58) Field of Classification Search
CPC ................ B62B 9/12; B62B 3/02; B62B 9/14
See application file for complete search history.

(56) References Cited

U.S. PATENT DOCUMENTS

| | | | | |
|---|---|---|---|---|
| 5,897,162 A | * | 4/1999 | Humes | B60N 2/28 297/180.12 |
| 6,127,655 A | * | 10/2000 | Humes | B60N 2/28 219/217 |
| 6,357,784 B1 | | 3/2002 | Mitzman | |
| 6,409,206 B1 | | 6/2002 | Willrich | |
| 8,182,030 B1 | | 5/2012 | Britten | |
| 8,628,109 B2 | | 1/2014 | Daley | |
| 9,044,867 B2 | * | 6/2015 | Rothschild | B62B 9/00 |
| 9,446,779 B2 | | 9/2016 | Rembisz | |
| 2008/0084040 A1 | * | 4/2008 | McGowan | B62B 9/00 280/47.38 |
| 2008/0272102 A1 | * | 11/2008 | Farrington | H05B 3/42 219/201 |
| 2008/0272103 A1 | * | 11/2008 | Farrington | A01K 27/003 219/201 |
| 2009/0261137 A1 | * | 10/2009 | Nooshin | A61G 5/10 224/539 |
| 2018/0236913 A1 | * | 8/2018 | Abreu | B60N 2/56 |
| 2019/0084606 A1 | * | 3/2019 | Acheampong | B62B 9/14 |

* cited by examiner

*Primary Examiner* — John D Walters
*Assistant Examiner* — James J Triggs (57) ABSTRACT

A illuminated stroller assembly includes a stroller that has handle. A control circuit is coupled to the handle, a heating element is coupled to the handle and a cooling unit is coupled to the handle. A blower is coupled to the handle and the blower urges air into the seat when the blower is turned on to enhance comfort for the child in the stroller. A receiver is coupled to the handle and the receiver is in remote electrical communication with an audio source for receiving an audio signal. A pair of speakers is each coupled to the handle for emitting audible sounds outwardly therefrom and each of the speakers receives the audio signal from the receiver.

11 Claims, 6 Drawing Sheets

ILLUMINATED STROLLER ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to stroller devices and more particularly pertains to a new stroller device for enhancing comfort for a child in a stroller.

BRIEF SUMMARY OF THE INVENTION

An embodiment of the disclosure meets the needs presented above by generally comprising a stroller that has handle. A control circuit is coupled to the handle, a heating element is coupled to the handle and a cooling unit is coupled to the handle. A blower is coupled to the handle and the blower urges air into the seat when the blower is turned on to enhance comfort for the child in the stroller. A receiver is coupled to the handle and the receiver is in remote electrical communication with an audio source for receiving an audio signal. A pair of speakers is each coupled to the handle for emitting audible sounds outwardly therefrom and each of the speakers receives the audio signal from the receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new stroller device embodying the principles and concepts of an embodiment of the disclosure and generally designated by the reference numeral 10 will be described.

As best illustrated in FIGS. 1 through 8, the illuminated stroller assemblies 42 10 generally comprises a stroller 12 has a frame 14, a plurality of front wheels 16, a plurality of rear wheels 18, a seat 20 and a handle 22. The seat 20 is positionable between and upright position for sitting and a reclined position for sleeping. The frame 14 is collapsible into a stored position and expandable into a deployed position. The handle 22 has panel section 24 and a pair of rod sections 26, and each of the rod sections 26 angles downwardly from a front side 28 of the panel section 24. Moreover, each of the rod sections 26 has a distal end 30 that is coupled to the frame 14 having the panel section 24 being horizontally oriented.

Figure 1:
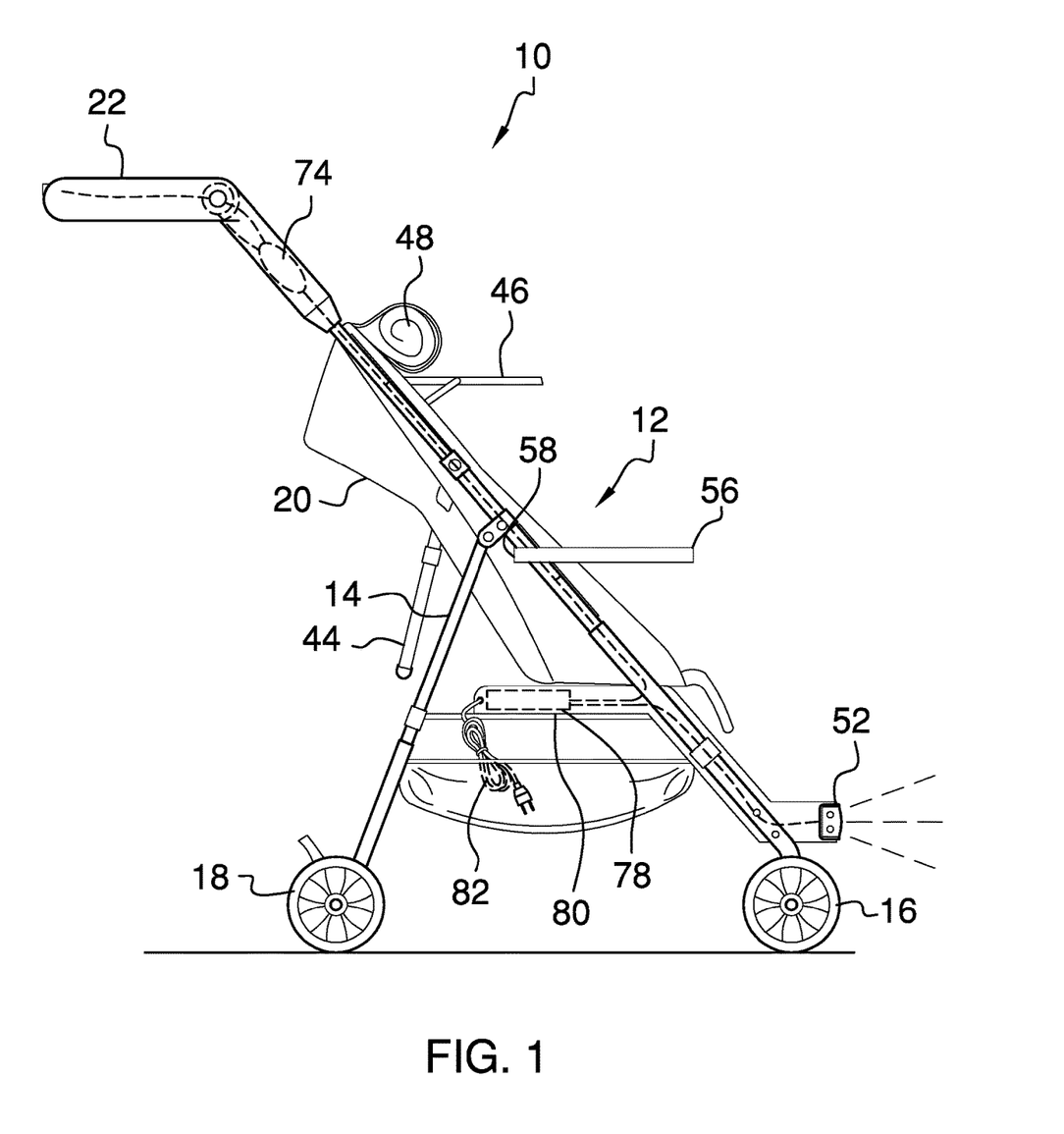
FIG. 1 is a right side phantom view of an illuminated stroller assembly according to an embodiment of the disclosure.
Figure 2:
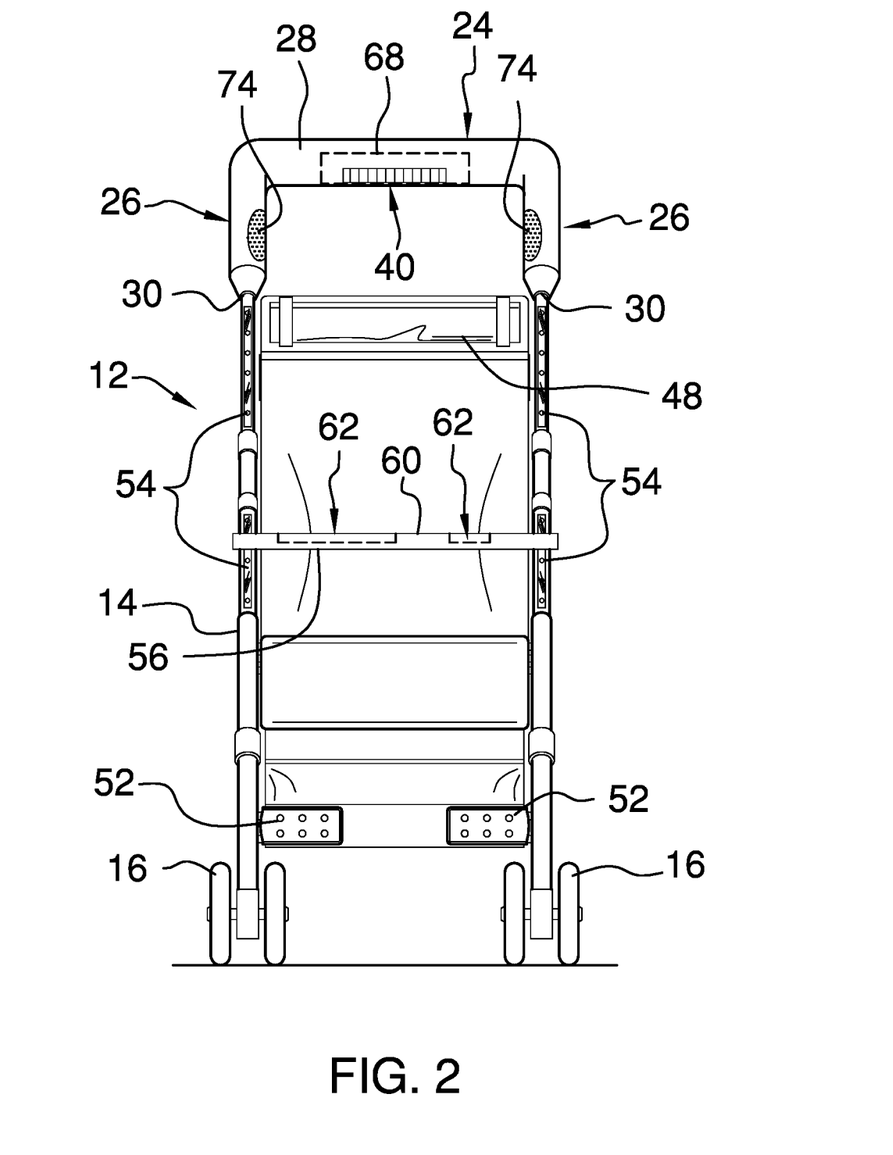
FIG. 2 is a front phantom view of an embodiment of the disclosure.
Figure 3:
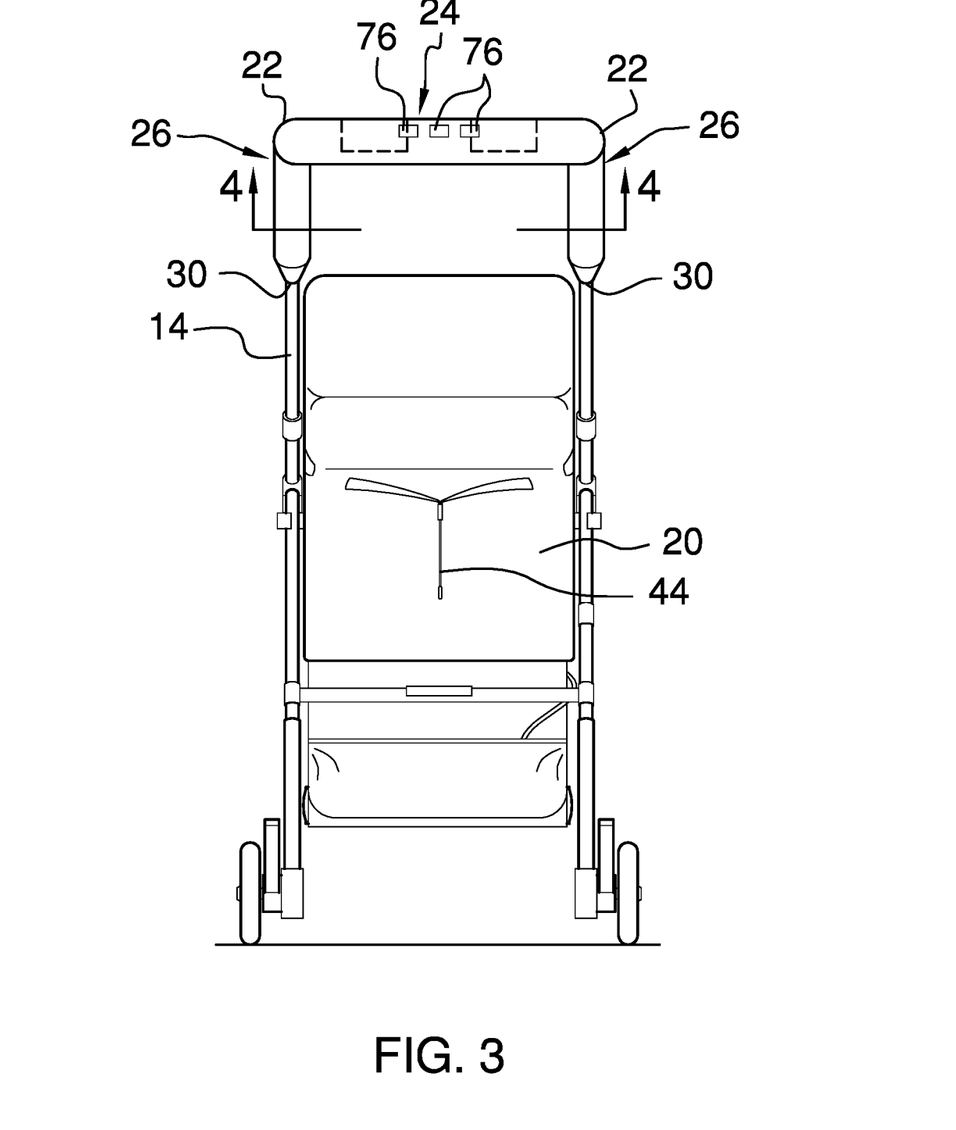
FIG. 3 is a back phantom view of an embodiment of the disclosure.
Figure 4:
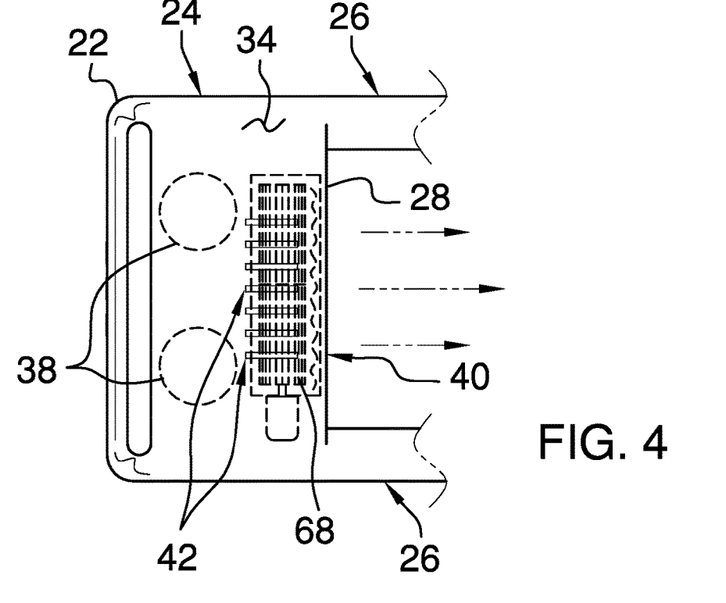
FIG. 4 is a bottom phantom view of a handle of an embodiment of the disclosure.
Figure 5:
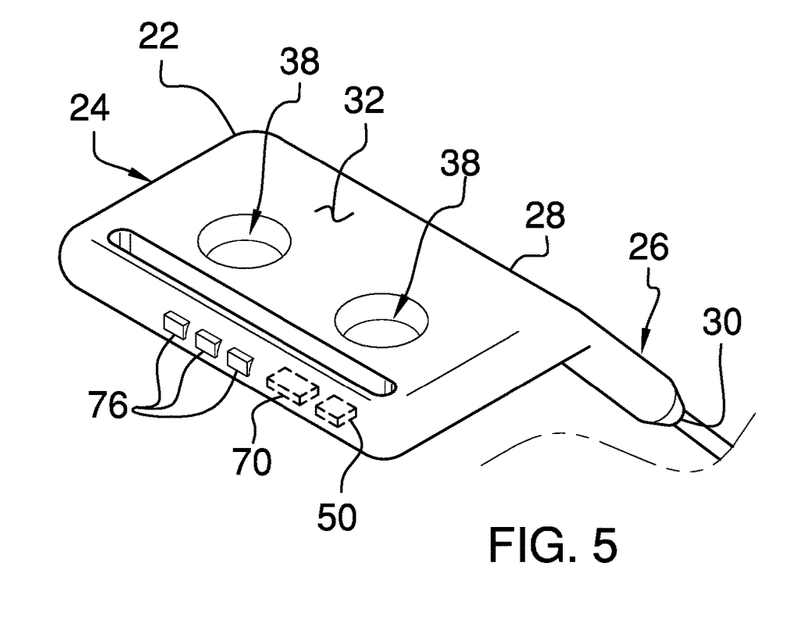
FIG. 5 is a top perspective view of a handle of an embodiment of the disclosure.
Figures 6, 7:
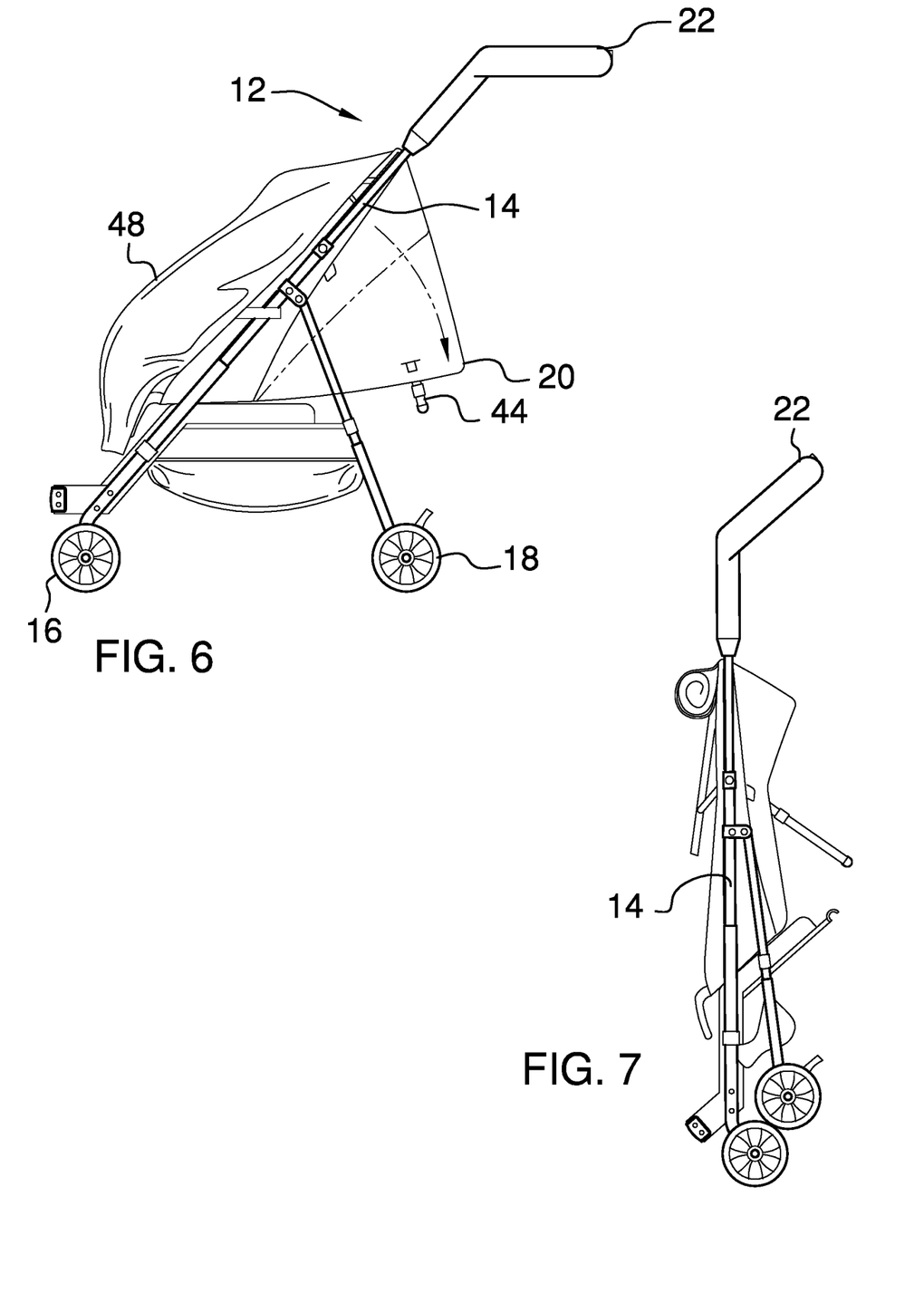
FIG. 6 is a left side view of an embodiment of the disclosure showing a seat being reclined.
FIG. 7 is a perspective view of an embodiment of the disclosure showing a frame being collapsed.
Figure 8:
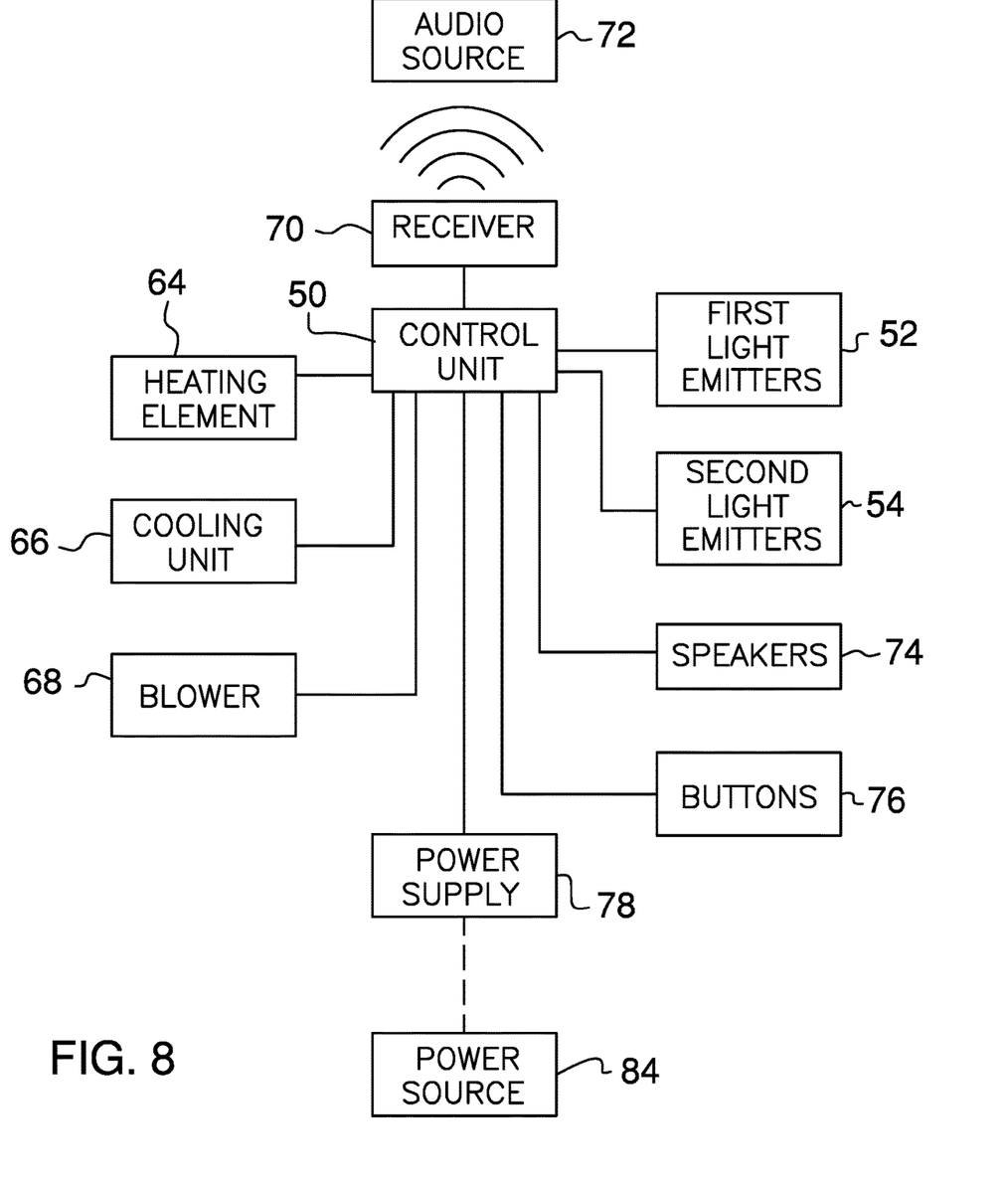
FIG. 8 is a schematic view of an embodiment of the disclosure.

The panel section 24 has a top surface 32 and a bottom surface 34, and the panel section 24 has a slot 36 extending through the top 32 and bottom 34 surfaces for gripping the slot 36. The top surface 32 has a plurality of wells 38 extending downwardly toward the bottom surface 34 for holding cylindrical beverage containers. The panel section 24 is hollow and the front side 28 of the panel has an air opening 40 extending into an interior of the panel section 24. Moreover, the bottom surface 34 of the panel section 24 has a plurality of vents 42 each extending into the interior of the panel section 24.

A strap 44 is coupled between the frame 14 and the seat 20 for adjusting the seat 20 between the upright position and the reclined position. The strap 44 engages the seat 20 for retaining the seat 20 in the upright position. A hood 46 is pivotally coupled to and extends forwardly from the frame 14 and the hood 46 is positioned above the seat 20 thereby shading the seat 20. A cover 48 is coupled to the frame 14 and the cover 48 is extendable over the seat 20 to shield the seat 20 from precipitation. The cover 48 is rollable onto itself for storage and the cover 48 is comprised of a translucent and fluid impermeable material.

A control circuit 50 is coupled to the handle 22. A first light emitter 52 is coupled to the stroller 12 for emitting light outwardly therefrom and the first light emitter 52 is electrically coupled to the control circuit 50. The first light emitter 52 is positioned on the frame 14 and is directed forwardly from the frame 14. The first light emitter 52 is aligned with the front wheels 16 for directing light forwardly from the stroller 12 to illuminate a pathway of the stroller 12 and the first light emitter 52 may be an LED or the like.

A plurality of second light emitters 54 is provided and each of the second light emitters 54 is coupled to the stroller 12 for emitting light outwardly therefrom. Each of the second light emitters 54 is electrically coupled to the control circuit 50 and each of the second light emitters 54 is positioned on the frame 14 and is directed forwardly from the frame 14. The second light emitters 54 are spaced apart from each other and are distributed around the frame 14. Additionally, each of the second light emitters 54 may comprise an LED strip or the like.

A tray 56 is coupled to the frame 14 and extends across the seat 20 such that the tray 56 is accessible to a child seated in the stroller 12. The tray 56 has a rear edge 58 and an upper surface 60, and the rear edge 58 is pivotally coupled to the frame 14. The upper surface 60 has a plurality of wells 62 extending downwardly therein for receiving cylindrical beverage containers.

A heating element 64 is coupled to the handle 22 and the heating element 64 is positioned within the panel section 24 of the handle 22. The heating element 64 is electrically coupled to the control circuit 50 and the heating element 64 produces heated air when the heating element 64 is turned on. The heating element 64 may be an electric heating element that has an operational temperature ranging between approximately 80.0 degrees Fahrenheit and 100.0 degrees Fahrenheit. A cooling unit 66 is coupled to the handle 22 and the cooling unit 66 is positioned within the handle 22 portion of the handle 22. The cooling unit 66 is electrically coupled to the control circuit 50 and the cooling unit 66 produces cooled air when the cooling unit 66 is turned on. The cooling unit 66 may be a thermoelectric cooling unit 66, such as a Peltier device or the like, that can produce cooled air without a compressor or a condenser.

A blower 68 is coupled to the handle 22 and the blower 68 is electrically coupled to the control circuit 50. The blower 68 urges air into the seat 20 when the blower 68 is turned on to enhance comfort for the child in the stroller 12. The blower 68 is in fluid communication with each of the heating element 64 and the cooling unit 66. Moreover, the blower 68 urges air inwardly through the vents 42 in the panel section 24 and outwardly through the air opening 40 in the panel section 24. The blower 68 urges the heated air outwardly through the air opening 40 when the heating element 64 is turned on to heat the child. Additionally, the blower 68 urges the cooled air outwardly through the air opening 40 when the cooling unit 66 is turned on to cool the child. The blower 68 may be an electric blower 68 of any conventional design.

A receiver 70 is coupled to the handle 22 and the receiver 70 is electrically coupled to the control circuit 50. The receiver 70 is in remote electrical communication with an audio source 72 for receiving an audio signal. The receiver 70 may be a radio frequency receiver 70 or the like and the receiver 70 may employ a WPAN signal and Bluetooth communication protocols. The audio source 72 may be a smart phone, a laptop computer or any other audio source 72 that is capable of wirelessly broadcasting an audio signal.

A pair of speakers 74 is each coupled to the handle 22 for emitting audible sounds outwardly therefrom. Each of the speakers 74 is electrically coupled to the control circuit 50 and each of the speakers 74 receives the audio signal from the receiver 70. Each of the speakers 74 is positioned on a respective one of the rod sections 26 of the handle 22 and each of the speakers 74 may be electronic speakers 74 of any conventional design. A plurality of buttons 76 is each movably coupled to the handle 22 and each of the buttons 76 is electrically coupled to the control circuit 50. Each of the buttons 76 controls operational parameters of a respective one of the heating unit, the cooling unit 66, the blower 68, the receiver 70, the first light emitter 52, the second light emitters 54 and the speakers 74.

A power supply 78 is coupled to the stroller 12 and the power supply 78 is electrically coupled to the control circuit 50. The power supply 78 comprises at least one rechargeable battery 80 that is electrically coupled to the control circuit 50. A power cord 82 is coupled to and extends away from the stroller 12 and the power cord 82 is electrically coupled to the at least one rechargeable battery 80. The power cord 82 is electrically pluggable into a power source 84 for charging the at least one rechargeable battery 80. The power source 84 may comprise a female electrical outlet or other source of electrical current.

In use, the stroller 12 is unfolded and employed in the traditional convention of stroller 12s for transporting a child. Selected buttons 76 are manipulated to turn on the first light emitter 52 for illuminating the pathway of the stroller 12 at night or to turn on the second light emitters 54. Additionally, selected buttons 76 are manipulated to turn on the heating element 64 and the blower 68 to warm to the child in cold temperatures or to turn on the cooling unit 66 and the blower 68 to cool the child in hot temperature. The receiver 70 is selectively synched with the audio source 72 for playing music or other audio through the speakers 74. The cover 48 is unrolled over the stroller 12

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated stroller assembly having an integrated heating a cooling fan wherein said assembly is configured to enhance comfort for a child riding in said assembly, said assembly comprising:

a stroller having a frame, a plurality of front wheels, a plurality of rear wheels, a seat and a handle, said seat being positionable between and upright position for sitting and a reclined position for sleeping, said frame being collapsible into a stored position and expandable into a deployed position;

a control circuit being coupled to said handle;

a heating element being coupled to said handle, said heating element being electrically coupled to said control circuit;

a cooling unit being coupled to said handle, said cooling unit being electrically coupled to said control circuit;

a blower being coupled to said handle, said blower being electrically coupled to said control circuit, said blower urging air into said seat when said blower is turned on wherein said blower is configured to enhance comfort to the child in said stroller;

a receiver being coupled to said handle, said receiver being electrically coupled to said control circuit, said receiver being in remote electrical communication with an audio source for receiving an audio signal; and a pair of speakers, each of said speakers being coupled to said handle for emitting audible sounds outwardly therefrom, each of said speakers being electrically coupled to said control circuit, each of said speakers receiving the audio signal from said receiver, each of said speakers being positioned on a respective one of said rod sections of said handle.

2. The assembly according to claim 1, wherein:

said handle has a panel section and a pair of rod sections, each of said rod sections angling downwardly from a front side of said panel section, each of said rod sections having a distal end being coupled to said frame having said panel section being horizontally oriented, said panel section having a top surface and a bottom surface;

said panel section having a slot extending through said top and bottom surfaces for gripping said slot;

said top surface having a plurality of wells extending downwardly toward said bottom surface for holding cylindrical beverage containers; and said panel section being hollow, said front side of said panel having an air opening extending into an interior of said panel section, said button surface of said panel section having a plurality of vents each extending into said interior of said panel section.

3. The assembly according to claim 1, further comprising a first light emitter being coupled to said stroller for emitting light outwardly therefrom, said first light emitter being electrically coupled to said control circuit, said first light emitter being positioned on said frame and being directed forwardly from said frame, said first light emitter being aligned with said front wheels for directed light forwardly from said stroller wherein said first light emitter is configured to illuminate a pathway of said stroller.

4. The assembly according to claim 3, further comprising a plurality of second light emitters, each of said second light emitters being coupled to said stroller for emitting light outwardly therefrom, each of said second light emitters being electrically coupled to said control circuit, each of said second light emitters being positioned on said frame and being directed forwardly from said frame, said second light emitters being spaced apart from each other and being distributed around said frame.

5. The assembly according to claim 2, wherein said heating element is positioned within said panel portion of said handle, said heating element being electrically coupled to said control circuit, said heating element producing heated air when said heating element is turned on.

6. The assembly according to claim 5, wherein said cooling unit is positioned within said handle portion of said handle, said cooling unit being electrically coupled to said control circuit, said cooling unit producing cooled air when said cooling unit is turned on.

7. The assembly according to claim 6, wherein said blower is in fluid communication with each of said heating element and said cooling unit, said blower urging air inwardly through said vents in said panel section and outwardly through said air opening in said panel section, said blower urging the heated air outwardly through said air opening when said heating element is turned on wherein said heating element is configured to heat the child, said blower urging the cooled air outwardly through said air opening when said cooling unit is turned on wherein said cooling unit is configured to cool the child.

8. The assembly according to claim 7, further comprising:

a first light emitter;

a second light emitter; and a plurality of buttons, each of said buttons being movably coupled to said handle, each of said buttons being electrically coupled to said control circuit, each of said buttons controlling operational parameters of a respective one of said heating unit, said cooling unit, said blower, said receiver, said first light emitters, said second light emitters and said speakers.

9. The assembly according to claim 8, further comprising a power supply being coupled to said stroller, said power supply being electrically coupled to said control circuit.

10. The assembly according to claim 9, further comprising said power supply comprising:

at least one rechargeable battery being electrically coupled to said control circuit; and a power cord being coupled to and extending away from said stroller, said power cord being electrically coupled to said at least one rechargeable battery, said power cord being electrically pluggable into a power source for charging said at least one rechargeable battery.

11. An illuminated stroller assembly having an integrated heating a cooling fan wherein said assembly is configured to enhance comfort for a child riding in said assembly, said assembly comprising:

a stroller having a frame, a plurality of front wheels and a plurality of rear wheels, a seat and a handle, said seat being positionable between and upright position for sitting and a reclined position for sleeping, said frame being collapsible into a stored position and expandable into a deployed position, said handle having panel section and a pair of rod sections, each of said rod sections angling downwardly from a front side of said panel section, each of said rod sections having a distal end being coupled to said frame having said panel section being horizontally oriented, said panel section having a top surface and a bottom surface, said panel having a slot extending through said top and bottom surfaces for gripping said slot, said top surface having a plurality of wells extending downwardly toward said bottom surface for holding cylindrical beverage containers, said panel section being hollow, said front side of said panel having an air opening extending into an interior of said panel section, said button surface of said panel section having a plurality of vents each extending into said interior of said panel section;

a strap being coupled to between said frame and said seat for adjusting said seat between said upright position and said reclined position, said strap engaging said seat for retaining said seat in said upright position;

a hood being coupled to and extending forwardly from said frame, said hood being positioned above said seat thereby shading said seat;

a cover being coupled to said frame, said cover being extendable over said seat wherein said cover is configured to shield said seat from precipitation, said cover being rollable onto itself for storage, said cover being comprised of a translucent and fluid impermeable material;

a control circuit being coupled to said handle;

a first light emitter being coupled to said stroller for emitting light outwardly therefrom, said first light emitter being electrically coupled to said control circuit, said first light emitter being positioned on said frame and being directed forwardly from said frame, said first light emitter being aligned with said front wheels for directed light forwardly from said stroller wherein said first light emitter is configured to illuminate a pathway of said stroller;

a plurality of second light emitters, each of said second light emitters being coupled to said stroller for emitting light outwardly therefrom, each of said second light emitters being electrically coupled to said control circuit, each of said second light emitters being positioned on said frame and being directed forwardly from said frame, said second light emitters being spaced apart from each other and being distributed around said frame;

a tray being coupled to said frame and extending across said seat wherein said tray is configured to be accessible to a child seated in said stroller, said tray having a rear edge and an upper surface, said rear edge being pivotally coupled to said frame, said upper surface having a plurality of wells extending downwardly therein for receiving cylindrical beverage containers;

a heating element being coupled to said handle, said heating element being positioned within said panel portion of said handle, said heating element being electrically coupled to said control circuit, said heating element producing heated air when said heating element is turned on;

a cooling unit being coupled to said handle, said cooling unit being positioned within said handle portion of said handle, said cooling unit being electrically coupled to said control circuit, said cooling unit producing cooled air when said cooling unit is turned on;

a blower being coupled to said handle, said blower being electrically coupled to said control circuit, said blower urging air into said seat when said blower is turned on wherein said blower is configured to enhance comfort to the child in said stroller, said blower being in fluid communication with each of said heating element and said cooling unit, said blower urging air inwardly through said vents in said panel section and outwardly through said air opening in said panel section, said blower urging the heated air outwardly through said air opening when said heating element is turned on wherein said heating element is configured to heat the child, said blower urging the cooled air outwardly through said air opening when said cooling unit is turned on wherein said cooling unit is configured to cool the child;

a receiver being coupled to said handle, said receiver being electrically coupled to said control circuit, said receiver being in remote electrical communication with an audio source for receiving an audio signal;

a pair of speakers, each of said speakers being coupled to said handle for emitting audible sounds outwardly therefrom, each of said speakers being electrically coupled to said control circuit, each of said speakers receiving the audio signal from said receiver, each of said speakers being positioned on a respective one of said rod sections of said handle;

a plurality of buttons, each of said buttons being movably coupled to said handle, each of said buttons being electrically coupled to said control circuit, each of said buttons controlling operational parameters of a respective one of said heating unit, said cooling unit, said blower, said receiver, said first light emitters, said second light emitters and said speakers; and a power supply being coupled to said stroller, said power supply being electrically coupled to said control circuit, said power supply comprising:
  at least one rechargeable battery being electrically coupled to said control circuit; and
  a power cord being coupled to and extending away from said stroller, said power cord being electrically coupled to said at least one rechargeable battery, said power cord being electrically pluggable into a power source for charging said at least one rechargeable battery.

* * * * *